Jan. 13, 1931.  C. S. BRAGG ET AL  1,788,378
BRAKE MECHANISM FOR AUTOMOTIVE VEHICLES
Original Filed Oct. 3, 1925  2 Sheets-Sheet 1
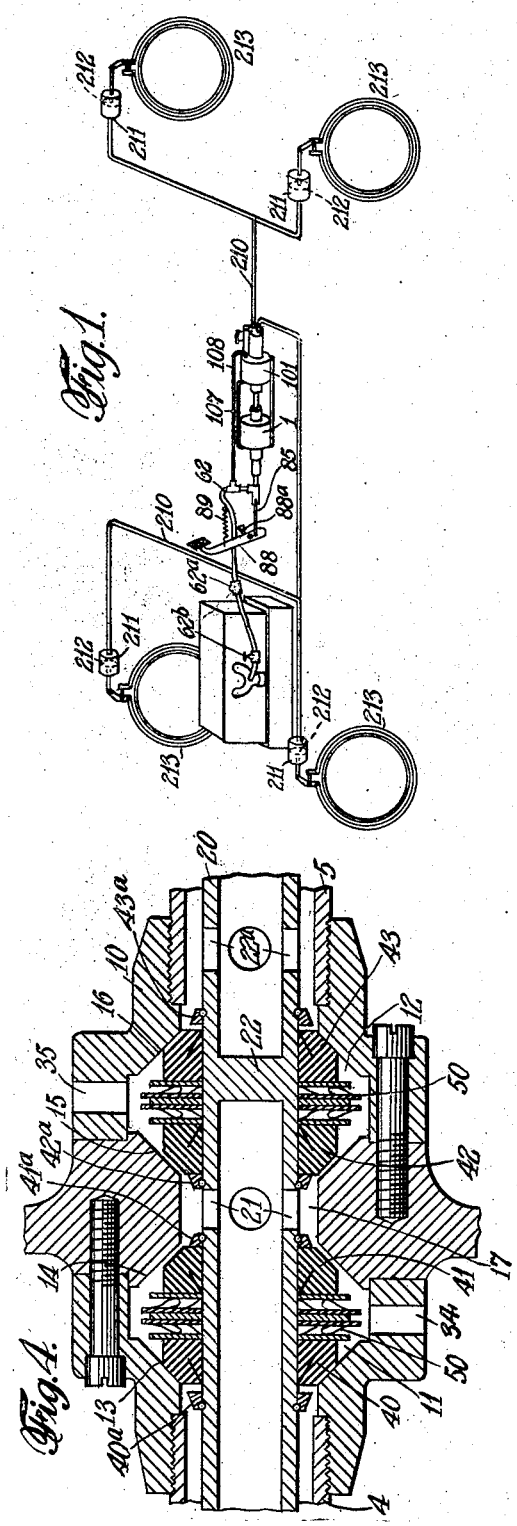
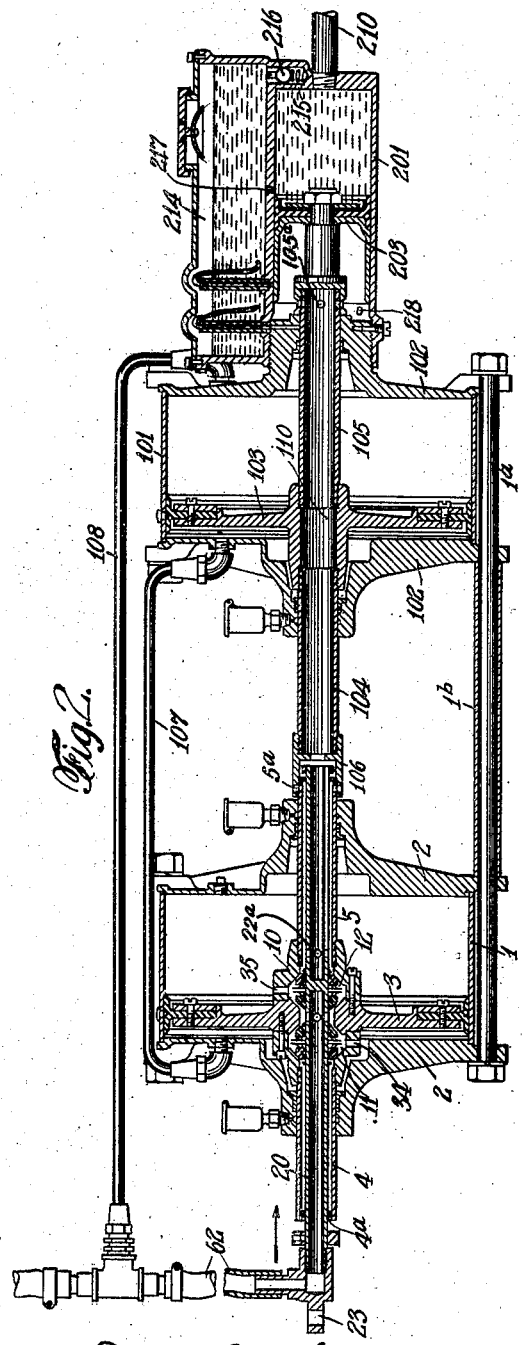

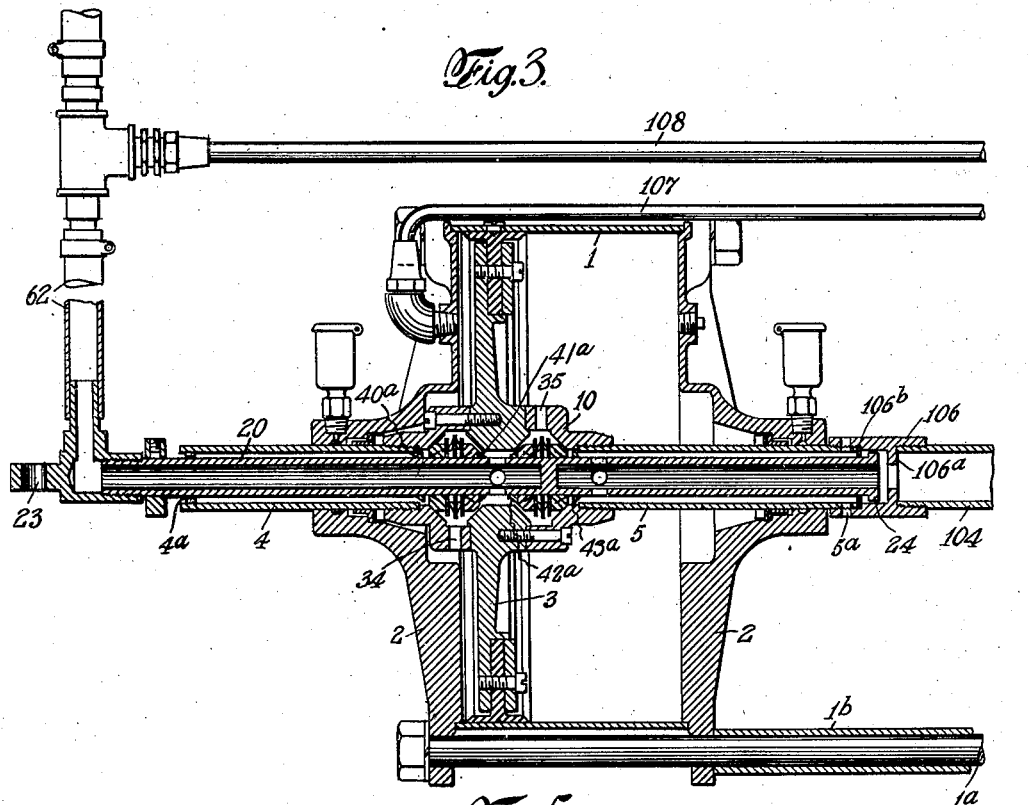
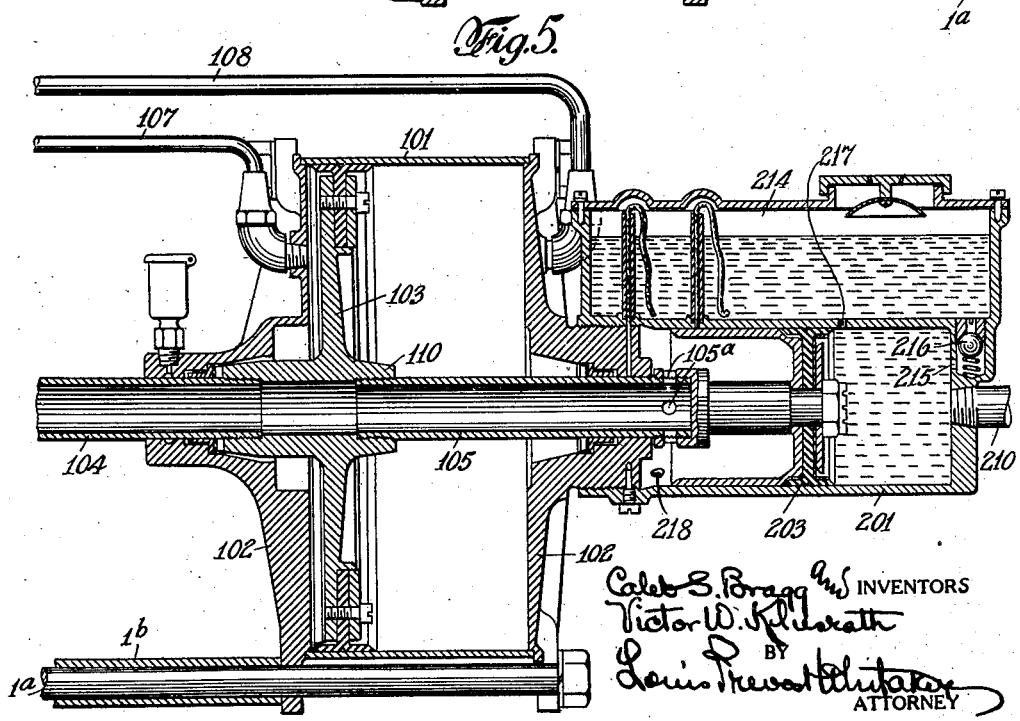

Patented Jan. 13, 1931

1,788,378

UNITED STATES PATENT OFFICE

CALEB S. BRAGG, OF PALM BEACH, FLORIDA, AND VICTOR W. KLIESRATH, OF PORT WASHINGTON, NEW YORK, ASSIGNORS TO BRAGG-KLIESRATH CORPORATION, OF LONG ISLAND CITY, NEW YORK, A CORPORATION OF NEW YORK

BRAKE MECHANISM FOR AUTOMOTIVE VEHICLES

Application filed October 3, 1925, Serial No. 60,172. Renewed January 17, 1928.

Our invention consists in the novel features hereinafter described, reference being had to the accompanying drawings which show one embodiment of our invention, selected by us for purposes of illustration, and the said invention is fully disclosed in the following description and claims.

Our present invention is an improved power actuator especially advantageous for operating brake mechanism of automotive vehicles, and conveniently operated from the intake manifold, or suction passage, of the internal combustion engine which propels the vehicle, although it may be employed for other purposes, as for operating steering or other mechanism for automotive vehicles operating on land, on or in water or in the air. In operating a power actuator requiring a very considerable amount of power, it is desirable to keep the size or diameter of the actuator cylinder or cylinders as small as possible to economize space and weight and it is highly important where such actuators are operated by atmospheric pressure working against a partial vacuum obtained by a connection with the suction passage of the internal combustion engine, that the smallest quantities of air possible be withdrawn from the actuator and discharged into the said suction passage, in order that the proper proportions of air and fuel in the mixture passing to the engine shall not be materially altered. The proper operation of an internal combustion engine requires the supply of explosive charges of pre-determined proportions of air and fuel, regulated as to quantity by the usual throttle valve, and the admission of large quantities of air into the suction passage is naturally attended by the danger of altering the proportions of air and fuel in the mixture to such an extent as to stall the engine, if idling, or otherwise interfering with its proper operation.

In carrying out our present invention, we propose to employ a plurality of actuator cylinders, and pistons, preferably two, arranged co-axially, and having their pistons connected for joint operation, both cylinders being closed at both ends, and one cylinder only being provided with reversing valve mechanism, constructed and arranged so as to maintain a rarified condition on both sides of each piston, when in the "off" or normal position, and to admit atmospheric air on one side or face of each piston to effect the power applying effect of the actuator, (as the application of brakes) while on the return stroke the reversing valve mechanism admits atmospheric air on the opposite side or face of one piston only, (as to effect the release of the brakes) and maintains the other piston or pistons immersed in vacua. By this construction the diameters of the cylinders and pistons can be kept down, while providing the necessary power, sufficient for example to apply the brakes of large trucks, busses, and the like, while on the power applying stroke practically no air will be discharged into the intake manifold of the engine, and while on the return stroke the air admitted to both cylinders for the power applying stroke will be exhausted and discharged into the manifold, after the pistons return to the "off", or normal position, the air admitted to one cylinder only (or to less than all the cylinders, if more than two are employed) will be exhausted, thus reducing very considerably the quantity of air which would otherwise be admitted to the manifold, and assisting in avoiding the danger of interfering with the carburetion and stalling of the motor if idling. The admission of atmospheric air to a single cylinder would ordinarily be more than ample for insuring the release of brakes, and the return of the piston or pistons of the other cylinder or cylinders to the "off" or normal position, which piston or pistons being immersed in vacua, would offer only slight resistance.

Referring to the accompanying drawings, Fig. 1 represents diagrammatically an installation of our improved power actuator in connection with an automotive vehicle for applying the brakes thereof.

Fig. 2 is an enlarged sectional view of the power actuator detached.

Fig. 3 is a sectional view of the main or valved actuator cylinder and piston, drawn to a still larger scale.

Fig. 4 is an enlarged sectional view of the reversing valve mechanism.

Fig. 5 is a similar view of the co-axial valveless actuator cylinder and piston.

In the drawings we have shown an embodiment of our invention including a main actuator, an auxiliary actuator, the main actuator being provided with reversing valve mechanism for controlling both actuators as hereinafter described.

As shown in Figs. 2, 3 and 4, the main actuator comprises a cylinder, 1, provided with heads, 2, 2, and a double acting piston, 3, to the hub of which are attached oppositely extending hollow piston rods, 4 and 5, projecting through suitable stuffing boxes in the heads, 2, 2. The hub, 10, of the piston is provided with reversing valve mechanism designed to control both actuators, one form of which is shown herewith, and which in this instance is constructed as follows, although the particular details of this valve mechanism are not claimed herein, and do not form part of our present invention. The piston hub is provided with valve chambers, 11 and 12, each provided with oppositely disposed conical valve seats, indicated at 13, 14, 15 and 16, respectively, to receive conical valves, 40, 41, and 42, 43. Between the valve chambers is located a suction chamber, 17, with which the valve chambers communicate by openings controlled by the valves, 42 and 41. Atmospheric air may be admitted to the valve chamber, 11, through apertures, 4ª, at the outer end of the piston rod, 4, under the control of valve 40, and likewise atmospheric air may be admitted to valve chamber, 12, through apertures, 5ª, in the piston rod, 5, under the control of valve, 43.

20 represents a valve actuating sleeve which extends through the hollow piston rods, 4 and 5, the piston hub and the valves, 40, 41, 42 and 43. The valves are provided with yielding retracting means tending to seat them and with means for sealing the apertures in the valves through which the sleeve, 20, passes. We prefer to make the valves of molded rubber and to construct them so that they fit air tight around the sleeve, while permitting the sleeve to move through the central apertures in the valves. We also prefer to employ annular spring retracting devices indicated at 50, loosely engaging the sleeve, 20, and interposed between the oppositely disposed valves, 40, 41, and 42, 43. The valve actuating sleeve, 20, is provided with collars, 40ª, 41ª, 42ª, 43ª, secured thereto by spring rings, or otherwise, for engaging the respective valves in a direction to open them. The collars, 41ª and 42ª, are so arranged as to hold both valves, 41 and 42, off their seats when the piston is in "off" or normal position, thereby establishing communication between the suction chamber, 17, and the cylinder on both sides of the piston, through the valve chambers, 11 and 12, and ports, 34 and 35, connecting said chambers respectively with the cylinder, the ports, 34, being located on one side of the piston and the ports, 35, being located on the opposite side of the piston.

The valve actuating sleeve, 20, is provided with apertures, 21, communicating with the vacuum or suction chamber, 17, and adjacent to said apertures we provide the sleeve with a plug or partition, 22. The other end of the sleeve, 20, is connected with a suitable source of suction, as the intake manifold of an internal combustion engine, by a suction pipe, 62, a portion of which is flexible to accommodate the longitudinal movements of the sleeve, and said sleeve is also provided with means, as a perforated lug, 23, for connecting it with an operator operated part. In this instance we have shown it in Fig. 1, connected by a link, 85, with a pivoted foot lever, 88, provided with a retracting spring, 89, and a stop, 88ª.

The auxiliary actuator comprises a cylinder, 101, closed at each end by heads, 102, 102, and provided with a piston 103. The auxiliary cylinder and piston are preferably arranged co-axially with the main cylinder and pistons, and the cylinders are connected rigidly together. They may be made integral, but we prefer to form them separately, and connect them in axial relation. This is conveniently accomplished by employing through bolts, 1ª, extending through lugs in the heads of both cylinders, spacing sleeves or collars, 1ᵇ, being placed on said bolts between the adjacent heads, 2 and 102, as shown, but we do not limit ourselves to this construction.

The auxiliary piston is preferably provided with a hollow hub, 110, to which are secured hollow piston rods, 104 and 105, extending through stuffing boxes in the opposite heads. The piston rod, 104, is directly connected with the hollow piston rod, 5, of the main actuator, in this instance by a screw collar, 106, into which the end of the valve actuating sleeve preferably projects. As will be seen, there is a certain amount of lost motion between the valve actuating sleeve and the main actuator piston, sufficient to operate the reversing valve mechanism, and it is desirable to limit this lost motion in order that the main actuator piston and the parts connected therewith, including the auxiliary actuator piston, and the brake mechanism, may be positively actuated by the operator operated part on failure of power, or to enable the operator to add his physical power to that exerted by the actuators, when desired. It is convenient to accomplish this by providing the valve actuating sleeve, 20, with a collar, 24, within the screw connecting collar 106, between internal annular flanges, 106ª and 106ᵇ, as clearly shown in Figs. 2 and 3.

It has been stated that when the parts are in the normal or off position, the main actuator cylinder is connected with the suction chamber and intake manifold, so that the main piston is immersed in vacua. The same is true of the auxiliary piston and to this end, we prefer to connect the auxiliary cylinder, 101, at the rear of the piston, when in retracted position, (at the left in Fig. 2) with the corresponding portion of the main cylinder by a pipe or passage, 107, and to connect the opposite end of the auxiliary cylinder at the right in Fig. 2, directly with the suction pipe, 62, by a pipe or passage, 108, independently of the reversing valve mechanism. By this construction, it will be noted that while the reversing valve mechanism can admit atmospheric air or higher pressure fluid in rear of the main and also the auxiliary piston, and on the forward side of the main piston, it cannot admit the higher pressure fluid, (atmospheric air) forward of the auxiliary piston, and consequently, no air will be withdrawn therefrom after rarification is effected therein, and there is that much less air to be delivered into the intake manifold of the engine.

The piston rod, 105, of the auxiliary actuator is intended to transmit the power of both actuators to the part to be actuated, in this case, and usually, the brake mechanism of an automotive vehicle. The power may be applied to the brakes in any desired manner. In the drawings, we have shown the piston rod, 105, connected with the main hydraulic piston, 203, of a hydraulic brake system, and arranged in the main hydraulic cylinder, which is connected by piping, indicated at 210, with a plurality of brake applying cylinders, 211, provided with pistons, 212, connected in any usual or desired manner, with the brake mechanisms, 213, which may be of any usual or preferred construction. We have shown the main hydraulic cylinder provided with a liquid reservoir, 214, for the non-compressible liquid (oil) employed in the hydraulic system, the reservoir being shown connected with the cylinder, 201, by a passage, 215, containing a check valve, 216, for filling the system, and by a passage, 217, adjacent to the piston when in retracted position, for venting the system. The details of the hydraulic system, however, form no part of our present invention, but are covered by a separate application for Letters Patent of the United States, filed by us on August 25th, 1925, and given Serial No. 51,300 and they will not be more particularly described, nor claimed herein.

The hydraulic cylinder, 201, is provided with breathing apertures, 218, in rear of piston, 203, and the hollow piston rod, 105, of the auxiliary actuator may be provided with apertures, 105ª, establishing communication from the atmosphere through the hollow piston rods, 105, 104, and 5, and the valve actuating sleeve, 20, which latter may be provided beyond the plug or partition, 22, with additional apertures, 22ª, if desired, to admit air to the valve chamber, 12, when the valve, 43, is opened.

The parts being constructed and arranged as described, the operation will be as follows: In the normal or "off" position, the pistons of the main and auxiliary actuators are in retracted position, and the valves, 41 and 42, are held off their seats, as shown in Figs. 2 and 3, by the stop, 88ª, for the hollow valve sleeve, 20, and by the pistons coming to rest against the rear end plates of the cylinders. It follows, therefore, that the main actuator cylinder, 1, will be exhausted on both sides of the piston, 3, through ports, 34 and 35, and the auxiliary actuator cylinder will likewise be exhausted on both sides of the piston by means of pipes or passages, 107 and 108, previously described. To apply the brakes, the operator will move the brake lever forward so as to move the valve actuating sleeve in the direction of the arrow in Fig. 2, thereby seating the valve, 41, and further opening the valve, 42, and opening valve, 40, admitting atmospheric air into the main actuator cylinder, 1, in rear of the piston, 3, and atmospheric air also passes from the main actuator cylinder, 1, to the auxiliary cylinder, 101, in rear of the piston, 103, through pipe, 107. Both pistons, 3 and 103, therefore, move in the direction of the arrow in Fig. 2, thereby moving the main hydraulic piston 203, and applying the brakes. Or the actuator piston may be operatively connected with the brake mechanism in any other desired manner. As soon as the movement of the valve actuating sleeve stops, the piston, 3, will overtake it, thereby seating the valve, 40, and so shutting off the source of pressure, thus permitting the equalization of pressures on the various sides of all pistons to hold the load of the applied brakes. If the load causes the piston, 3, to move slightly with respect to sleeve, 20, valve, 41, will be seated and valve, 40, opened to admit sufficient air to sustain the load, or valve, 40, will remain seated and valve, 41, opened to withdraw any excess of the higher pressure air.

To effect the release of the brakes, the operator relieves his pressure on the brake lever, permitting the retracting spring, 89, to move the valve actuating rod in a direction opposite to that indicated by the arrow in Fig. 2. This effects the opening of the valve, 41, to withdraw the air previously admitted to the rear of the pistons, 3 and 103, for the application of the brakes, the closing of valve, 42, and the opening of valve, 43. The latter admits air (or higher pressure fluid) into cylinder, 1, through port, or ports, 35, forward of piston, 3, (at the right in Figs. 2 and 3) but no air is admitted to cylinder, 101, forward of the piston, 103, which becomes immersed in vacuum, by means of the pipe connections. The piston, 3, is returned by the air admitted through valve, 43, to its normal or "off" position, carrying with it the piston, 103, and the hydraulic piston, 203, and thus positively relieving the brakes. As before stated, the admission of air (or higher pressure fluid) to one actuator cylinder only, is more than sufficient for the release of the brakes, and for the return of the pistons to the normal or off position. When the parts come to rest, the valve actuating sleeve will be arrested in such position as to hold both valves, 41 and 42, cracked, thus permitting within cylinder, 1, the simultaneous equalization of pressures, and the withdrawal of the air admitted to said cylinder, only, in effecting the return stroke. This reduces the amount of air to be exhausted and delivered to the manifold, practically one-half or more, and this smaller quantity of air can be distributed into the manifold under the control of the regulating valve, so as not to interfere materially with the operation of the engine. We therefore obtain by our invention, greatly increased power from an actuator having cylinders of comparatively small diameter, without a corresponding increase in the amount of air to be delivered into the manifold. We also prefer to place a check valve, 62ª, in the pipe, 62, between the intake manifold and the cylinders to maintain, within the cylinders, during the periods when the throttle is open, the maximum rarification obtained each time the throttle is closed. We also prefer to provide the restricting valve, 62ᵇ, in the suction pipe, 62, adjacent to the intake manifold in order to prevent the air withdrawn from the actuator being delivered into the intake manifold so rapidly as to interfere with the operation of the engine so as to stall the engine if idling.

The valve actuating sleeve may be arrested in position to hold valves, 41 and 42, off of their seats when the main actuator piston is in the "off" or normal position, by any suitable means, as by a stop, 88ª, with which the foot lever, 88, may be provided, as shown, or in any other desired way.

It will also be seen that in case of failure of power, the operator can apply his physical force to the pistons, 3, 103 and 203, to apply the brakes, and may, if desired, add his physical force to the force exerted by the actuators, by taking up the lost motion between the collar, 24, and the collars, 106ª, and 106ᵇ, so that actuation of the brake mechanism may always be effected, even should the power fail for any reason.

What we claim and desire to secure by Letters Patent is:—

1. The combination of a main actuator, comprising a cylinder, a double acting piston therein, and means including reversing valve mechanism and connections therefrom to a source of suction and to a source of higher pressure fluid, for establishing differential pressures on opposite faces of the piston, said valve mechanism being constructed to hold said piston in a balanced condition in an interjacent position of said valve mechanism, an auxiliary actuator comprising a cylinder closed at both ends, and a piston therein, the portion of said cylinder on one face of the piston being connected to the corresponding portion of the main actuator cylinder, and the portion of the auxiliary actuator cylinder on the opposite face of the piston, having an outlet passage independent of said reversing valve mechanism, connected with the source of suction, and operative connections between the main and auxiliary pistons, whereby higher pressure fluid may be admitted to both cylinders to effect a power stroke and to one cylinder only, to effect the return stroke.

2. The combination of a main actuator, comprising a cylinder, a double acting piston therein, and means including reversing valve mechanism and connections therefrom to a source of suction, and to a source of higher pressure fluid, for establishing differential pressures on opposite faces of the piston, said valve mechanism being constructed to hold said piston in a balanced condition in an interjacent position of said valve mechanism, an auxiliary actuator comprising a cylinder closed at both ends and a piston therein, the portion of said cylinder on one face of the piston being connected to the corresponding portion of the main actuator cylinder, and the portion of the auxiliary actuator cylinder on the opposite face of the piston, having an outlet passage independent of said reversing valve mechanism, connected with the source of suction, means for holding the reversing valve mechanism in position to connect the main actuator cylinder on both faces of the piston with the source of suction, when the main piston is in the "off" or normal position, and operative connections between the main and auxiliary pistons, whereby both pistons are normally immersed in vacua, and higher pressure fluid may be admitted on one side of each piston to effect a power stroke, and may be admitted on the reverse face of the main actuator piston only, on the return stroke, to minimize the quantity of higher pressure fluid exhausted by the suction source.

3. The combination in an automotive vehicle, provided with an internal combustion engine, and brake mechanism of a main actuator, comprising a cylinder, a double acting piston therein, and reversing valve mechanism, a suction pipe connecting said valve mechanism with the suction passage of the engine, means for admitting higher pressure fluid to said valve mechanism, said valve mechanism being constructed to connect the main actuator cylinder with the said suction passage on both sides of the piston when the piston is in "off" or normal position, an auxiliary valveless actuator, comprising a cylinder closed at both ends, a piston therein, operatively connected with the main actuator piston for joint movement therewith, a tubular connection between one end portion of the main actuator cylinder, and the corresponding end portion of the auxiliary actuator cylinder, a tubular connection from the opposite end of the auxiliary actuator cylinder and said suction passage, independent of said reversing valve mechanism, and operative connections between the said pistons and the brake mechanism, whereby both pistons will be immersed in vacua when in the "off" position, and whereby on the power stroke to apply the brakes, higher pressure fluid will be admitted to the corresponding faces of both pistons, but on the return stroke higher pressure fluid will be admitted on the opposite face of the main actuator piston only.

4. The combination in an automotive vehicle, provided with an internal combustion engine, and brake mechanism of a main actuator, comprising a cylinder, a double acting piston therein, and reversing valve mechanism, a suction pipe connecting said valve mechanism with the suction passage of the engine, means for admitting higher pressure fluid to said valve mechanism, said valve mechanism being constructed to connect the main actuator cylinder with the said suction passage on both sides of the piston, when the piston is in "off" or normal position, an auxiliary valveless actuator comprising a cylinder closed at both ends, a piston therein, operatively connected with the main actuator piston for joint movement therewith, a tubular connection between one end portion of the main actuator cylinder, and the corresponding end portion of the auxiliary actuator cylinder, a tubular connection from the opposite end of the auxiliary actutator cylinder and said suction passage independent of said reversing valve mechanism, and operative connections between the said pistons and the brake mechanism, and an operator operated part for actuating said reversing valve mechanism, connected to said pistons by means permitting lost motion, whereby the physical power of the operator may be transmitted to said pistons, when desired to add to the power of the actuators, or to operate the brake mechanism in case of failure of power.

5. The combination with a main power actuator comprising a cylinder, a double acting piston therein and reversing valve mechanism, a suction pipe connected with said valve mechanism, and means for admitting higher pressure fluid to said valve mechanism, of an auxiliary valveless actuator, comprising a cylinder permanently supported co-axially with the main actuator cylinder closed at both ends, and provided with a piston connected with the main actuator piston, a tubular connection from one end portion of the main cylinder to the corresponding end portion of the auxiliary cylinder, a suction pipe connected with the opposite end portion of the auxiliary cylinder, independently of said reversing valve mechanism, operator operated means for controlling said reversing valve mechanism, and operative connections extending from said connected pistons and adapted to be connected with a part to be operated.

6. The combination with a main power actuator comprising a cylinder, a double acting piston therein, and reversing valve mechanism, a suction pipe connected with said valve mechanism, and means for admitting higher pressure fluid to said valve mechanism, said valve mechanism being constructed to connect the main actuator cylinder on both sides of the piston with the suction pipe, of an auxiliary valveless actuator, comprising a cylinder closed at both ends, and a piston, co-axial with the main cylinder and piston, the main actuator piston being provided with a piston rod connected with the auxiliary actuator piston, and one of said pistons being provided with means for connecting it with a part to be actuated, a tubular connection from the portion of said main actuator cylinder, on one side of the piston to the corresponding portion of the auxiliary actuator cylinder, the portion of the latter cylinder on the opposite side of the piston being connected to said suction pipe independently of the valve mechanism, and an operator operated part for controlling said reversing valve mechanism.

7. The combination with a main actuator, comprising a cylinder, a double acting piston therein, and reversing valve mechanism located in said piston, a tubular suction passage connected with said valve mechanism, including a longitudinally movable valve actuating sleeve, hollow piston rods connected with said piston and extending through opposite ends of the cylinder, and providing means for admitting a higher pressure fluid to said valve mechanism, of an auxiliary valveless actuator comprising a cylinder closed at both ends and a piston arranged co-axially with respect to the main actuator piston and cylinders, said cylinders being secured rigidly with respect to each other, said auxiliary actuator piston being provided with piston rods extending through opposite ends of the auxiliary actuator cylinder, one being rigidly secured to a piston rod of the main actuator and the other being provided with means for connecting it to a part to be actuated, a tubular passage connecting the main cylinder on one side of its piston with the corresponding portion of the auxiliary cylinder, and a tubular passage connecting the auxiliary cylinder on the opposite side of its piston, with the suction passage, independently of the reversing valve mechanism.

8. The combination with a main actuator, comprising a cylinder, a double acting piston therein and reversing valve mechanism located in said piston, a tubular suction passage connected with said valve mechanism including a longitudinally movable valve actuating sleeve, hollow piston rods connected with said piston and extending through opposite ends of the cylinder, and providing means for admitting a higher pressure fluid to said valve mechanism, of an auxiliary valveless actuator, comprising a cylinder closed at both ends, and a piston arranged co-axially with respect to the main actuator piston and cylinders, said cylinders being secured rigidly with respect to each other, said auxiliary actuator piston being provided with piston rods extending through opposite ends of the auxiliary actuator cylinder, one being rigidly secured to a piston rod of the main actuator and the other being provided with means for connecting it to a part to be actuated, a tubular passage connecting the main cylinder on one side of its piston with the corresponding portion of the auxiliary cylinder, and a tubular passage connecting the auxiliary cylinder on the opposite side of its piston, with the suction passage, independently of the reversing valve mechanism, an operator operated part connected with said valve actuating sleeve, and connections between said sleeve and one of said pistons, providing sufficient lost motion to permit of the operation of the reversing valve mechanism.

9. The combination of a main actuator, comprising a cylinder, a double acting piston therein, and means including reversing valve mechanism and connections therefrom to a source of suction and to a source of higher pressure fluid, for establishing differential pressures on opposite faces of the piston, said valve mechanism being constructed to hold said piston in a balanced condition in an interjacent position of said valve mechanism, an auxiliary actuator comprising a cylinder, and a piston therein, the portion of said cylinder on one face of the piston being connected with the corresponding portion of the main actuator cylinder, and the portion of the auxiliary actuator cylinder on the opposite face of the piston, having an outlet passage independent of said reversing valve mechanism, connected with the source of suction, whereby higher pressure fluid may be admitted to both cylinders to effect the power stroke and withdrawn from both cylinders, and may be admitted to one cylinder only to effect the return stroke thereof, and means for effecting the return stroke of the other piston without the admission of air to the cylinder thereof.

10. The combination of a main actuator, comprising a cylinder, a double acting piston therein, and means including reversing valve mechanism and connections therefrom to a source of suction, and to a source of higher pressure fluid, for establishing differential pressures on opposite faces of the piston, said valve mechanism being constructed to hold said piston in a balanced condition in an interjacent position of said valve mechanism, an auxiliary actuator comprising a cylinder and a piston therein, the portion of said cylinder on one face of the piston being connected to the corresponding portion of the main actuator cylinder, and the portion of the auxiliary actuator cylinder on the opposite face of the piston, having an outlet passage independent of said reversing valve mechanism, connected with the source of suction, means for holding the reversing valve mechanism in position to connect the main actuator cylinder on both faces of the piston with the source of suction, when the main piston is in the "off" or normal position, and means for effecting the return stroke of the auxiliary piston without admitting higher pressure fluid to the auxiliary cylinder, whereby both pistons are normally immersed in vacuum and higher pressure fluid may be admitted to both cylinders on one side of each piston to effect a power stroke, and withdrawn from both cylinders, and may be admitted to the main actuator cylinder only on the reverse face of the main actuator piston on the return stroke, to minimize the quantity of higher pressure fluid exhausted by the suction source.

11. The combination in an automotive vehicle provided with an internal combustion engine having a suction passage and brake mechanism, of a main actuator comprising a cylinder, a double acting piston therein, and reversing valve mechanism, means for connecting said cylinder with the said suction passage of the engine and with the atmosphere under the control of said reversing valve mechanism, said valve mechanism being constructed to hold said piston in a balanced condition in an interjacent position of said valve mechanism, an auxiliary actuator comprising a cylinder closed at both ends and a piston therein, the portion of the auxiliary cylinder on one face of the piston being connected to the corresponding portion of the main actuator cylinder, and the portion of the auxiliary actuator cylinder on the opposite face of the piston being connected with the source of suction independently of the valve mechanism for the main actuator, connections between said pistons and brake mechanism of the vehicle, and an operator operated part connected with the valve mechanism for the main actuator, whereby air may be admitted to both cylinders to simultaneously effect a power stroke of both pistons to apply the brakes connected therewith, and to the main cylinder only to effect the release of the brake mechanism without admitting air to the auxiliary actuator cylinder.

12. The combination in an automotive vehicle provided with an internal combustion engine having a suction passage and brake mechanism, of a main actuator comprising a cylinder, a double acting piston therein, and reversing valve mechanism, means for connecting said cylinder with said suction passage of the engine and with the atmosphere under the control of said reversing valve mechanism, said valve mechanism being constructed to hold said piston in a balanced condition in an interjacent position of said valve mechanism, an auxiliary actuator comprising a cylinder closed at both ends and a double piston therein, the portion of the auxiliary cylinder on one face of the piston being connected to the corresponding portion of the main actuator cylinder, and the portion of the auxiliary actuator cylinder on the opposite face of the piston being connected with the source of suction independently of the valve mechanism for the main actuator, connections between said pistons and brake mechanism of the vehicle, an operator operated part connected with the valve mechanism for the main actuator, the main and auxiliary actuator pistons being positively connected for joint operation, whereby air may be admitted to both cylinders to simultaneously effect a power stroke of both pistons to apply the brakes connected therewith and to the main cylinder only to effect the return movement of both pistons and the brake mechanism connected therewith.

13. The combination in an automotive vehicle provided with an internal combustion engine having a suction passage and brake mechanism, of a main actuator comprising a cylinder, a double acting piston therein, and reversing valve mechanism, means for connecting said cylinder with said suction passage of the engine and with the atmosphere under the control of said reversing valve mechanism, said valve mechanism being constructed to hold said piston in a balanced condition in an interjacent position of said valve mechanism, an auxiliary actuator comprising a cylinder closed at both ends and a double piston therein, the portion of the auxiliary cylinder on one face of the piston being connected to the corresponding portion of the main actuator cylinder, and the portion of the auxiliary actuator cylinder on the opposite face of the piston being connected with the source of suction independently of the valve mechanism for the main actuator, connections between said pistons and brake mechanism of the vehicle, an operator operated part connected with the valve mechanism for the main actuator, and operative connections between said operator operated part and the main actuator piston providing lost motion sufficient to insure the operation of the valve mechanism, whereby air may be admitted to both cylinders to simultaneously effect a power stroke of both pistons to apply the brakes connected therewith and to the main cylinder only to effect the release of the brake mechanism without admitting air to the auxiliary actuator cylinder, and whereby the operator may add his physical force to the main actuator piston and operate the same by physical force alone in case of failure of power.

14. The combination in an automotive vehicle provided with an internal combustion engine having a suction passage and brake mechanism, of a main actuator comprising a cylinder, a double acting piston therein, and reversing valve mechanism, means for connecting said cylinder with said suction passage of the engine and with the atmosphere under the control of said reversing valve mechanism, said valve mechanism being constructed to hold said piston in a balanced condition in an interjacent position of said valve mechanism, an auxiliary actuator comprising a cylinder closed at both ends and a double piston therein, the portion of the auxiliary cylinder on one face of the piston being connected to the corresponding portion of the main actuator cylinder, and the portion of the auxiliary actuator cylinder on the opposite face of the piston being connected with the source of suction independently of the valve mechanism for the main actuator, connections between said pistons and brake mechanism of the vehicle, an operator operated part connected with the valve mechanism for the main actuator, said pistons being positively connected for joint movement and the operator operated part being connected with the main actuator pistons by means permitting lost motion sufficient to operate the valve mechanism, whereby air may be admitted to both actuator cylinders to effect a simultaneous power stroke of both pistons to apply the brakes connected therewith and to the main cylinder only to effect the return movement of both pistons and the brake mechanism connected therewith, and whereby the operator may add his physical force to both pistons and the brake mechanism connected therewith and may operate both pistons and the brake mechanism connected therewith by physical force alone in case of failure of power.

In testimony whereof we affix our signatures.

CALEB S. BRAGG.
VICTOR W. KLIESRATH.